Patented June 12, 1923.

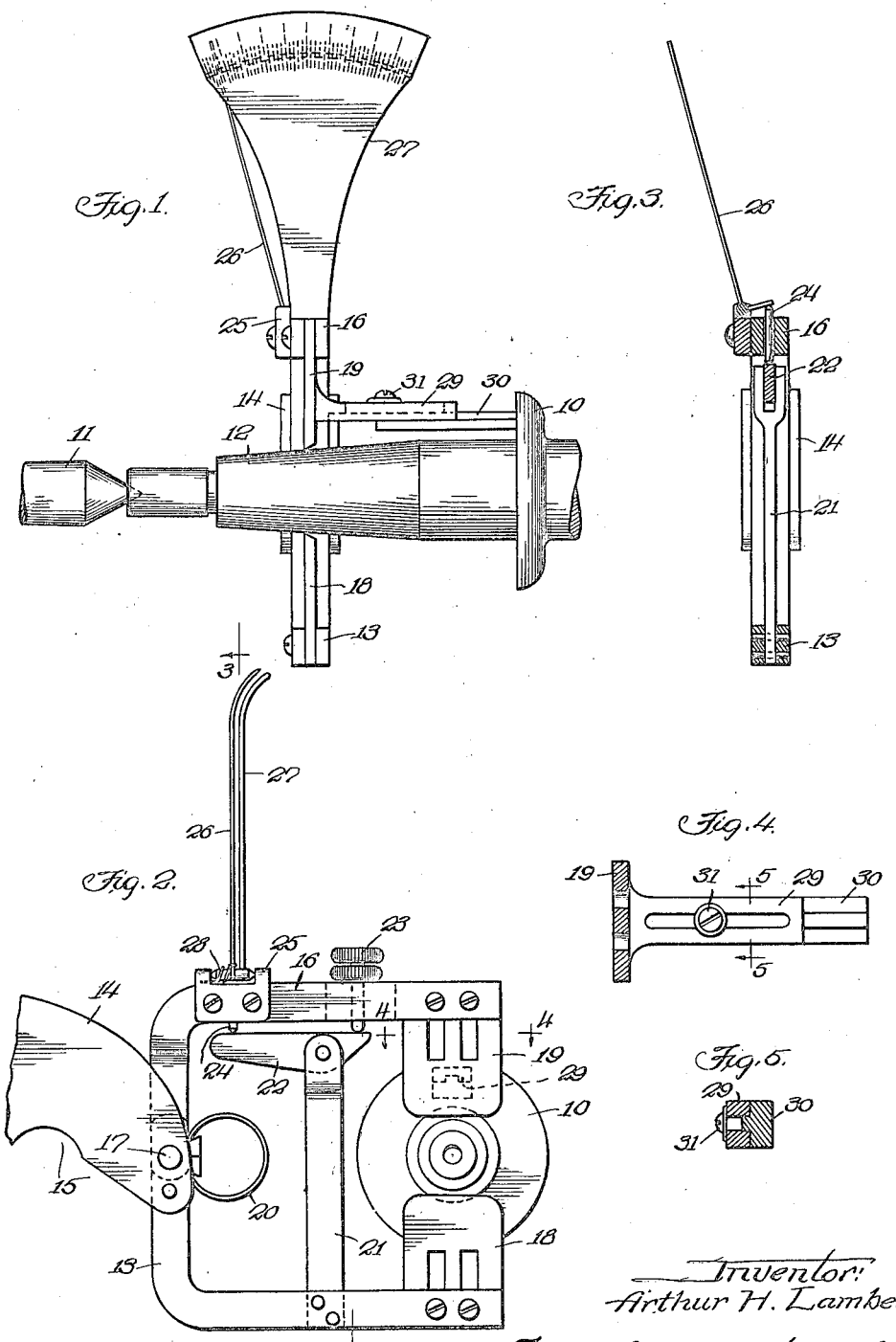

1,458,306

UNITED STATES PATENT OFFICE.

ARTHUR H. LAMBERT, OF MUSKEGON, MICHIGAN, ASSIGNOR TO MUSKEGON MOTOR SPECIALTIES COMPANY, A CORPORATION OF MICHIGAN.

MICROMETER.

Application filed September 14, 1920. Serial No. 410,209.

*To all whom it may concern:*

Be it known that I, ARTHUR H. LAMBERT, a citizen of the United States, residing at Muskegon, in the county of Muskegon and State of Michigan, have invented certain new and useful Improvements in Micrometers, of which the following is a specification.

This invention relates to micrometers.

It is particularly useful for gaging the diameter of articles, especially tapering articles.

Patent No. 972,196, October 11, 1910, discloses a micrometer which, in many respects, is similar to the one set forth herein. However, the micrometer of the foregoing patent is not particularly suited for accurately and quickly gaging articles at predetermined points in their lengths.

One of the objects of this invention is to provide a micrometer which will gage the diameter of an article at a predetermined point in its length.

Another object is to provide a micrometer which may be readily adjusted to gage the diameter of an article at a predetermined distance from one end, and when once set, will gage other articles at the same relative point.

Other objects will hereinafter appear.

An embodiment of the invention is illustrated in the accompanying drawing, wherein:—

Fig. 1 is a front elevation of a micrometer showing a method of application thereof.

Fig. 2 is a side elevation.

Fig. 3 is a section on the line 3—3 of Fig. 2.

Fig. 4 is a section on the line 4—4 of Fig 2, and

Fig. 5 is a section on the line 5—5 of Fig. 4.

The micrometer set forth herein is particularly applicable for use in gaging tapered lathe and grinder work. Lathes and grinders for this kind of work are ordinarily provided with tool attachments which carry a cutting or grinding tool at a given angle to the work, so that the work is reduced at a desired taper. The proper diameter of a particular piece of work may be determined by measuring the diameter of the work at a fixed distance from one end thereof. If the diameter at such distance is correct and the lathe or grinder is functioning properly, the diameter throughout the taper will be correct.

The micrometer as it has been employed in practice gages the diameter of the work at predetermined distances from the face of a face plate or chuck of the lathe or grinder. The proper diameter of an article at a given distance from the face plate or chuck having been determined, the micrometer may be set and calibrated to accurately and quickly gage the diameter of other articles at the same place.

Only such portions of a lathe or grinder are illustrated diagrammatically as are necessary to an understanding of the application and operation of the micrometer.

The lathe or grinder has a face plate or chuck 10 and a tail stock 11 which support the opposite ends of the work 12. The work is shown as a tapered shaft or post.

The micrometer has an arm 13 to which is rigidly attached a suitable handle 14. Handle 14 is provided with a depression 15, adapted to fit over a rod or rest on the lathe or grinder, to steady and support the micrometer as it is applied to the work.

A relatively movable arm 16 is hinged to arm 13 by a pivot pin 17.

Arms 13 and 16 may be constructed of paired and separated steel bars bent into the desired shape.

Arm 13 has a hardened jaw 18 adjustably secured thereto and arm 16 adjustably carries a similar jaw 19. The free ends of arms 13 and 16 are resiliently biased toward each other by a spring 20.

Jaws 18 and 19 are for engaging the work at diametrically opposite points. For tapered work the engaging edges of these jaws are preferably beveled as clearly shown in Fig. 1.

Arm 13 has a post 21 rigidly secured thereto. Post 21 carries a pivoted lever 22 at its upper end. The short arm of lever 22 is engaged by an adjustable screw 23 threaded thru arm 16. The longer arm of lever 22 cooperates with a pin 24 slidably held by arm 16.

A bracket 25 secured to arm 16 provides a pivotal bearing for a pointer 26. Bracket 25 also carries a plate 27 in front of which the pointer may move and on which suitable graduations may be provided.

A spring 28 biases the pointer to its initial or zero position and maintains the same in engagement with pin 24.

Jaw 19 has a bracket 29 rigidly secured thereto. This bracket extends from jaw 19 at substantially right angles. Bracket 29 is provided with a slideway in which is positioned a slidable extension 30. Bracket 29 is slotted to receive a clamping screw 31 which threads into extension 30.

Extension 30 is adapted to engage the face of the face plate or chuck of the lathe or grinding machine to determine the distance therefrom at which jaws 18 and 19 will engage diametrically opposite points of the work.

The micrometer is used as follows:

Assuming that a tapered piece of work is to be brought to the required size and that the cutting or grinding tool attachment has been set to produce the desired taper, the required diameter of the work at a certain distance from one end is determined. Extension 30 is then adjusted in bracket 29 so that when the end of the extension is against the face plate or chuck, jaws 18 and 19 will engage the work at the proper distance from one end thereof. The point of the scale of plate 27 on which pointer 26 should register for the required diameter, having been or being now determined, the micrometer is lifted by its handle and applied to the work, depression 15 co-operating with the rest on the lathe or grinder to support and steady the same. The micrometer may be moved along the work, with jaws 18 and 19 on opposite sides thereof, until extension 30 engages the face plate or chuck, the pointer then indicates the diameter of the work at the predetermined distance from one end.

The bracket may be quickly and easily adjusted to different lengths and, when once set, will invariably limit the movement of the micrometer toward the face plate or chuck of the lathe or grinding machine so that a quantity of articles may be readily and quickly gaged or measured relatively at the same place. The pointer and its co-operating scale may be calibrated so that diameters in inches or fractions thereof or any other convenient scale may be read directly.

Although the micrometer has been described as gaging the diameter from a face plate or chuck of the machine it will be understood that it may be used to gage the diameter from any part of the work which can serve as a relatively fixed abutment for the micrometer.

Having described my invention what I claim as new and desire to secure by Letters Patent is:—

A micrometer for measuring elongated tapering objects comprising a pair of pivoted measuring jaws for engaging opposite sides of the object to be calipered, and a gage extending axially of the object and adjustable to locate the jaws at the same point of the taper of a plurality of like objects.

In testimony whereof I hereunto sub- graduations may be provided.

ARTHUR H. LAMBERT.